3,418,077
PHOSPHORIC ACID
Norman Robinson, Felixstowe, Suffolk, England, assignor to Fisons Fertilizers Limited, Felixstowe, Suffolk, England
No Drawing. Filed Feb. 2, 1966, Ser. No. 524,490
Claims priority, application Great Britain, Feb. 12, 1965, 6,101/65
13 Claims. (Cl. 23—165)

ABSTRACT OF THE DISCLOSURE

A method for making concentrated phosphoric acid directly from phosphate rock and sulphuric acid wherein the calcium sulphate is precipitated as hemihydrate. The method involves reacting the phosphate rock with the recycle phosphoric acid, preferably recycle phosphoric acid slurry, containing a specified percentage of dissolved sulphate ion and then treating the product with a specified excess of sulphuric acid.

---

The present invention is concerned with an improved process for the production of phosphoric acid, and in particular a process for the production of phosphoric acid of a concentration in excess of 40% $P_2O_5$.

The wet-process for the manufacture of phosphoric acid is well known and comprises the reaction of mineral phosphates consisting mainly of calcium phosphate with sulphuric acid, the principal products of this reaction being phosphoric acid and calcium sulphate. The crystalline form in which the calcium sulphate is precipitated depends on the temperature and concentration of the reaction solution, high temperatures and high concentrations favouring the formation of calcium sulphate anhydrite; lower temperatures and concentrations favouring the formation of calcium sulphate hemihydrate; and low temperatures, for example of the order of 65° C. to 80° C., and low concentrations, for example of the order 30–32% by weight $P_2O_5$, favouring the formation of calcium sulphate dihydrate (gypsum).

It would appear from this that in order to obtain concentrated phosphoric acid it is merely necessary to carry out the reaction at elevated temperatures and concentrations to precipitate the calcium sulphate as anhydrite or possibly hemihydrate. However, the major problem in the successful and economically acceptable manufacture of phosphoric acid lies in the removal of the formed calcium sulphate and the washing of the separated calcium sulphate to remove associated phosphoric acid. Up to the present time the only successful commercial methods for the manufacture of phosphoric acid by this general process have been based on the precipitation of the calcium sulphate as gypsum producing a phosphoric acid of a concentration of 30–32% $P_2O_5$. The difficulties of obtaining the precipitated calcium sulphate as hemihydrate or anhydrite in a readily filtrable form which can be washed satisfactorily have prevented the use of either alternative for the successful commercial manufacture of phosphoric acid.

It has now been found that if mineral phosphate is reacted with acid in two stages so that calcium sulphate is precipitated in given amounts in both stages, there being an excess dissolved calcium ions in the first stage and there being a given excess of sulphate ions in the second stage, a slurry comprising concentrated phosphoric acid and calcium sulphate hemihydrate is obtained, the calcium sulphate hemihydrate being easy to filter and wash and the phosphoric acid being recoverable economically at high concentrations.

Accordingly the present invention is for a continuous process for the production of phosphoric acid having a concentration of at least 40% $P_2O_5$ by weight, preferably having a concentration in the range 45% to 55% $P_2O_5$ by weight, which comprises, in a first stage, reacting, in the presence of an excess of calcium ions, mineral phosphate with at least 9 parts by weight of phosphoric acid for every part by weight of calcium fed as mineral phosphate, said phosphoric acid containing at least 37% by weight $P_2O_5$ and 1%–3% by weight of dissolved sulphate ion, whereby the mineral phosphate is substantially converted into a slurry comprising monocalcium phosphate, phosphoric acid, and calcium sulphate, the percentage of dissolved calcium ion precipitated as calcium sulphate being 10–60%, preferably 20–50% by weight of the total calcium fed to the first stage, in a second stage, reacting the slurry obtained from the first stage with sulphuric acid whereby phosphoric acid containing at least 40% $P_2O_5$ by weight and calcium sulphate hemihydrate is formed, the sulphuric acid being used in an amount 0.5 to 2.0% by weight in excess of that required to convert the calcium content of the mineral phosphate fed to the first stage into calcium sulphate, and, in a third stage, separating the phosphoric acid from the calcium sulphate hemihydrate and washing the crystals, and removing part of the phosphoric acid as product, there being recycled to the first stage to provide the phosphoric acid reactant, slurry from the second stage and/or product phosphoric acid with or without wash liquors from the third stage, the amount of phosphoric acid fed to the first stage being such that the ratio of the amount of $P_2O_5$ fed to the first stage as phosphoric acid to the amount of $P_2O_5$ fed to the first stage as mineral phosphate is in the range 4–45 preferably is in the range 9–43 and the temperature in the first and second stages being in the range 80–115° C., preferably being in the range 90–110° C.

In the first stage of the process an excess of calcium ions is present during the reaction of the phosphate rock with phosphoric acid. By this is meant that there is always a greater number of dissolved calcium ions than dissolved sulphate ions in the reaction solution during the first stage.

The mineral phosphate consists mainly of calcium phosphate and may be obtained from a number of sources but is primarily phosphate rock. The phosphate rock may be Morocco phosphate rock, Florida phosphate rock, Nauru phosphate rock, Christmas Island phosphate rock and the like. The mineral phosphate used in the process of the present invention should be particulate and may be of a particle size over a wide range but suitably has a relatively coarse particle size, for example in the range such that for instance although 100% will pass a 10 B.S.S. mesh, at the most only 40% will pass through a 100 B.S.S. mesh.

The phosphoric acid fed to the first stage preferably contains 40% to 52% by weight of $P_2O_5$ and preferably contains at least 15% by weight of solids.

In one embodiment of the invention the phosphoric acid fed to the first stage consists of product phosphoric acid and/or wash liquors which have been separated from calcium sulphate hemihydrate in the third stage of the process. In another embodiment of the invention the phosphoric acid fed to the first stage consists of the slurry comprising phosphoric acid and calcium sulphate hemihydrate as obtained from the second stage admixed with product phosphoric acid and/or wash liquors which have been separated from calcium sulphate hemihydrate in the third stage of the process.

The sulphuric acid used in the process of the present invention preferably has a concentration of 90–100% $H_2SO_4$ by weight. The sulphuric acid may be fed to the second stage of the reaction alone or may be diluted with product slurry from the second stage and/or by product acid from the third stage. The sulphuric acid is preferably used in an amount 0.8 to 1.5% by weight in excess of that required to convert the calcium content of the mineral phosphate fed to the first stage into calcium sulphate.

The first stage of the present process may be accomplished in one or more reaction vessels. If more than one vessel is used the mineral phosphate and the recycle phosphoric acid may be fed wholly to the first vessel or in part to each vessel. The second stage of the process of the present invention may also be accomplished in one or more reaction vessels. If more than one reaction vessel is used in the second stage the sulphuric acid may be fed wholly to the first vessel or in part to each vessel but it must be ensured that any phosphoric acid slurry which is returned as recycle phosphoric acid originates from a vessel in the second stage giving a product containing the required level of sulphate ion. Preferably the first stage of the process of the present invention takes place in one vessel and the second stage of the process takes place in one vessel.

The reaction volume in which the first stage of the process takes place has been found to affect the size of the hemihydrate produced. If the reaction volume in the first stage is smaller than the reaction volume in the second stage small hemihydrate crystals are produced but surprisingly if the reaction volume in the first stage is equal to or greater than the second stage the size of the hemihydrate crystals is comparatively large. Suitably, therefore, the total reaction volume in the first stage is greater than or equal to the total reaction volume in the second stage. Desirably the reaction volume in the first stage is 1.0 to 3 times the reaction volume in the second stage.

In the third stage of the process the phosphoric acid may be separated from the calcium sulphate hemihydrate by filtration or centrifugation. Preferably the phosphoric acid is separated from the hemihydrate by filtration. In the filtration step the slurry is fed onto a filter cloth where as much undiluted phosphoric or "strong acid" filtrate is removed as possible. To extract further quantities of phosphoric acid, the cake left on the filter cloth is subjected to one or more washes with water or weak phosphoric acid derived from a water wash when so called "wash acid" or "wash liquors" are recovered.

The so called "strong acid" filtrate is product acid and contains at least 40% by weight $P_2O_5$ for instance 45% to 55% by weight $P_2O_5$. The wash acid or acids are usually returned to the first stage of the process. Some "strong acid" filtrate may also be returned to the first stage of the process.

The following examples are given to illustrate the process of the present invention.

EXAMPLE 1

The reaction was performed in two vessels the first vessel having twice the volume of the second vessel. To the first vessel was fed particulate Morocco phosphate rock ($P_2O_5$, 33.4%; CaO, 51.2% about 20% through 100 B.S.S. mesh) at 17 parts per hour and phosphoric acid at 274 parts per hour the phosphoric acid containing 2% by weight of dissolved sulphate and consisting of 224 parts of liquid phase fed as slurry from the second vessel and 50 parts of a mixture of "strong acid" and "wash acid" from the filters containing 44% by weight of $P_2O_5$. The amount of phosphoric acid fed to the first vessel was such that 30% by weight of the calcium in the phosphate rock fed to the first vessel was precipitated as calcium sulphate in the first vessel as a result of reaction of calcium ions with sulphate ions in the phosphoric acid fed to the first vessel. The temperature in this reactor was 100° C.

To the second reactor was fed slurry from the first reactor and 16.0 parts per hour of sulphuric acid (96% $H_2SO_4$) so as to give a 1% excess of sulphuric acid over that required to convert the calcium content of the phosphate rock fed to the first reactor into calcium sulphate. The temperature in the second vessel was 100° C.

Part of the product from the second vessel was returned to the first vessel and the remainder was fed to the filters. The product fed to the filters contained a fast filtering hemihydrate having a specific surface area of 450 square centimetres per gram and containing 0.95% w./w. insoluble $P_2O_5$ and 0.18% w./w. soluble $P_2O_5$ on a dry basis. The "strong acid" filtrate obtained from the filters contained 50% w./w. $P_2O_5$. The filter cake was given a three stage wash and the wash liquors were returned to the first vessel. The specific surface area is a measure of the crystal size, the larger the specific surface area the smaller the crystal size and, therefore, the more difficult it is to filter or wash.

EXAMPLE 2

The reaction was performed in 2 vessels of equal size but otherwise the conditions were as specified in Example 1. In this case the product fed to the filters had a specific surface area of 620 square centimetres per gram and contained 1.05% w./w. insoluble $P_2O_5$ and 0.25% w./w. soluble $P_2O_5$. The "strong acid" filtrate contained 49% w./w. $P_2O_5$.

EXAMPLE 3

The conditions were the same as in Example 1 except that 15.7 parts of 98% sulphuric acid was fed to the second vessel this corresponding to a 1.3% excess of sulphuric acid and the temperature in the two vessels was maintained at 105° C. In this case the product fed to the filters had a specific surface area of 480 square centimetres per gram and contained 0.93% w./w. insoluble $P_2O_5$ and 0.15% w./w. of soluble $P_2O_5$. The "strong acid" filtrate contained 51% $P_2O_5$.

EXAMPLE 4

The conditions were the same as in Example 1 except that the amount of recycle phosphoric acid was such that 43% by weight of the calcium in the phosphate rock fed to the first vessel was precipitated as calcium sulphate in the first vessel. In this case the product fed to the filters had a specific surface area of 730 square centimetres per gram and contained 0.83% w./w. insoluble $P_2O_5$ and 0.38 w./w. soluble $P_2O_5$. The "strong acid" filtrate contained 52% $P_2O_5$.

EXAMPLE 5

The process of Example 1 was repeated except that 16.3 parts of sulphuric acid (94% $H_2SO_4$) was fed to the second reactor so as to give a 1% excess of sulphuric acid. The temperature in the reactors was maintained at 95° C. in this case the product fed to the filters had a specific surface area of 470 square centimetres per gram and contained 1.08% w./w. insoluble $P_2O_5$ and 0.18 w./w. soluble $P_2O_5$. The "strong acid" filtrate contained 52% $P_2O_5$.

Comparative experiment

Example 1 was repeated except that the amount of recycle phosphoric acid was such that 73% by weight of the calcium in the phosphate rock fed to the first vessel was precipitated as calcium sulphate in the first vessel. The product fed to the filters had a specific surface area of 2,200 square centimetres per gram and contained 0.61 w./w. insoluble $P_2O_5$ and 3.1 w./w. soluble $P_2O_5$. Thus $P_2O_5$ losses were high and the product was so difficult to filter as to make the process uneconomic.

I claim:
1. A continuous process for the production of phosphoric acid having a concentration in the range 40%–55% $P_2O_5$ by weight which comprises, in a first stage, reacting, in the presence of an excess of calcium ions, mineral phosphate with at least 9 parts by weight of phosphoric acid for every part by weight of calcium fed as mineral phosphate, said phosphoric acid containing 37% to 52% by weight of $P_2O_5$ and 1%–3% by weight of dissolved sulphate ion, whereby the mineral phosphate is substantially converted into a slurry comprising monocalcium phosphate, phosphoric acid and calcium sulphate, the percentage of dissolved calcium ion precipitated as calcium sulphate being 10–60% by weight of the total calcium fed to the first stage, in the second stage, reacting the slurry obtained from the first stage with sulphuric acid whereby phosphoric acid containing 40% to 55% by weight $P_2O_5$ and calcium sulphate hemihydrate is formed, the sulphuric acid being used in an amount 0.5% to 2.0% by weight in excess of that required to convert the calcium content of the mineral phosphate fed to the first stage into calcium sulphate and, in a third stage, separating the phosphoric acid from the calcium sulphate hemihydrate and removing at least part of the separated phosphoric acid as product, washing the crystals of calcium sulphate hemihydrate and recovering wash liquors containing phosphoric acid, wherein the phosphoric acid fed to the first stage may be obtained from either the slurry of the second stage, the product acid, the wash liquor or a combination of these the amount of phosphoric acid fed to the first stage being such that the ratio of the amount of $P_2O_5$ fed to the first stage as phosphoric acid to the amount of $P_2O_5$ fed to the first stage as mineral phosphate is in the range 4–45 and the temperature in the first and second stages being in the range 80–115° C.

2. A process as claimed in claim 1 wherein the percentage of dissolved calcium ion precipitated in the first stage is in the range 20–50% by weight of the total calcium fed to the first stage.

3. A process as claimed in claim 1 wherein the temperature in the first and second stages is in the range 90° to 110° C.

4. A process as claimed in claim 1 wherein the ratio of the amount of $P_2O_5$ fed to the first stage as phosphoric acid to the amount of $P_2O_5$ fed to the first stage as mineral phosphate is in the range 9–43.

5. A process as claimed in claim 1 wherein the mineral phosphate is phosphate rock.

6. A process as claimed in claim 1 wherein the phosphate rock has a particle size such that 100% will pass a 10 B.S.S. mesh but at the most only 40% will pass through a 100 B.S.S. mesh.

7. A process as claimed in claim 1 wherein the phosphoric acid fed to the first stage contains at least 15% by weight of solids.

8. A process as claimed in claim 1 wherein the phosphoric acid fed to the first stage consists of the slurry comprising phosphoric acid and calcium sulphate hemihydrate as obtained from the second stage admixed with product phosphoric acid and wash liquors as obtained in the third stage.

9. A process as claimed in claim 1 wherein the concentration of the sulphuric acid fed to the second stage is in the range 90–100% $H_2SO_4$ by weight.

10. A process as claimed in claim 1 wherein the sulphuric acid is used in an amount 0.8 to 1.5% by weight in excess of that required to convert the calcium content of the mineral phosphate fed to the first stage into calcium sulphate.

11. A process as claimed in claim 1 wherein the total reaction volume in the first stage is greater than or equal to the total reaction volume in the second stage.

12. A process as claimed in claim 1 wherein the total reactor volume in the first stage is 1.0 to 3 times the total reaction volume in the second stage.

13. A process as claimed in claim 1 wherein in the third stage the phosphoric acid is separated from the calcium sulphate hemihydrate by filtration.

References Cited

UNITED STATES PATENTS

| 2,897,053 | 7/1959 | Svanoe | 23—165 |
| 3,017,247 | 1/1962 | Huxley | 23—165 |
| 3,326,635 | 6/1967 | Davenport et al. | 23—165 |

FOREIGN PATENTS 1,343,574 11/1963 France.

OSCAR R. VERTIZ, *Primary Examiner.*

A. GREIF, *Assistant Examiner.*

U.S. Cl. X.R.

23—122